March 14, 1939.   J. F. G. CHOBERT   2,150,361
METHOD OF AND APPARATUS FOR SECURING HOLLOW BODIES IN HOLES IN OTHER BODIES
Filed May 16, 1936   12 Sheets-Sheet 1
Fig. 1
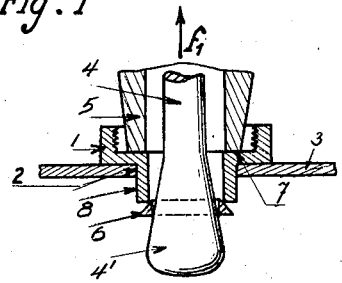
Fig. 2
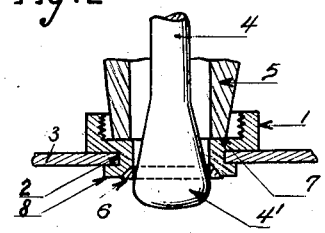
Fig. 3
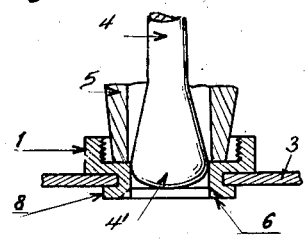
Fig. 4
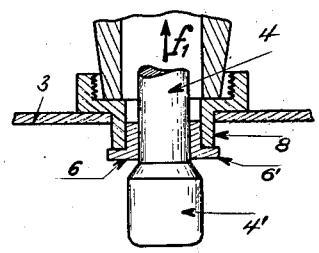
Fig. 5
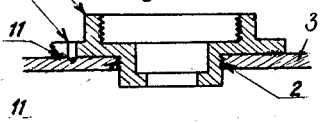
Fig. 6
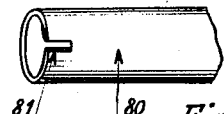
Fig. 7
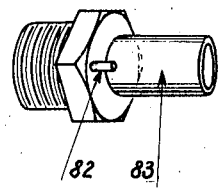
Fig. 8
Fig. 9
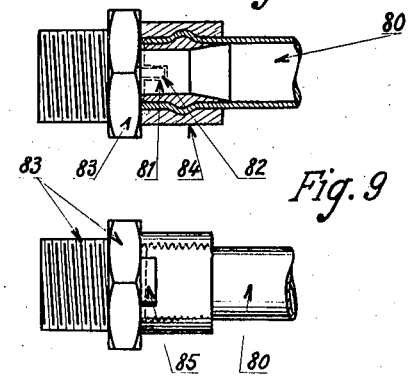
J. F. G. Chobert,
INVENTOR.
By Prevost & Prevost
Attorneys March 14, 1939.  J. F. G. CHOBERT  2,150,361
METHOD OF AND APPARATUS FOR SECURING HOLLOW BODIES IN HOLES IN OTHER BODIES
Filed May 16, 1936   12 Sheets-Sheet 2

J. F. G. Chobert,
INVENTOR.

March 14, 1939.   J. F. G. CHOBERT   2,150,361
METHOD OF AND APPARATUS FOR SECURING HOLLOW BODIES IN HOLES IN OTHER BODIES
Filed May 16, 1936   12 Sheets-Sheet 3

J. F. G. Chobert,
INVENTOR.
By Prindle & Prindle
Attorneys

March 14, 1939. J. F. G. CHOBERT 2,150,361
METHOD OF AND APPARATUS FOR SECURING HOLLOW BODIES IN HOLES IN OTHER BODIES
Filed May 16, 1936 12 Sheets-Sheet 4

J. F. G. Chobert
INVENTOR.

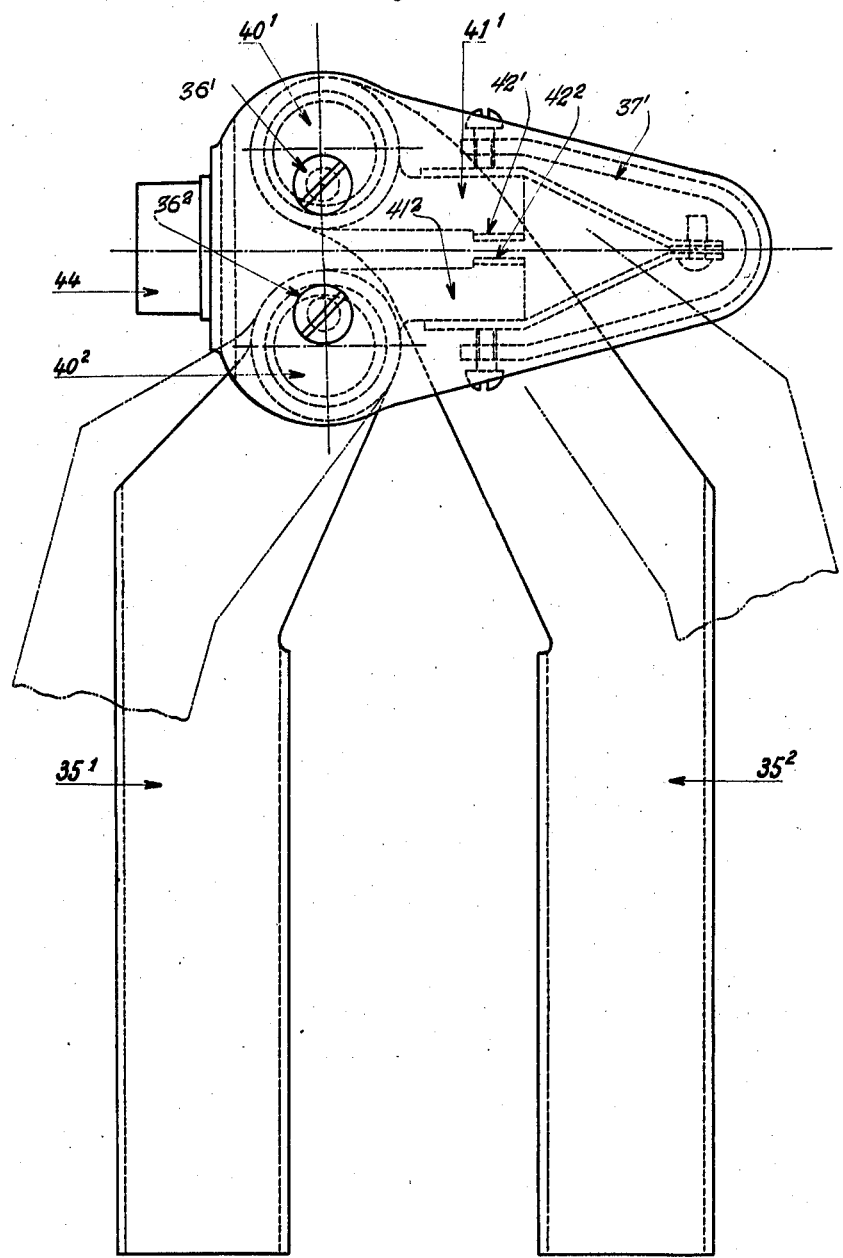

March 14, 1939. J. F. G. CHOBERT 2,150,361
METHOD OF AND APPARATUS FOR SECURING HOLLOW BODIES IN HOLES IN OTHER BODIES
Filed May 16, 1936 12 Sheets-Sheet 6
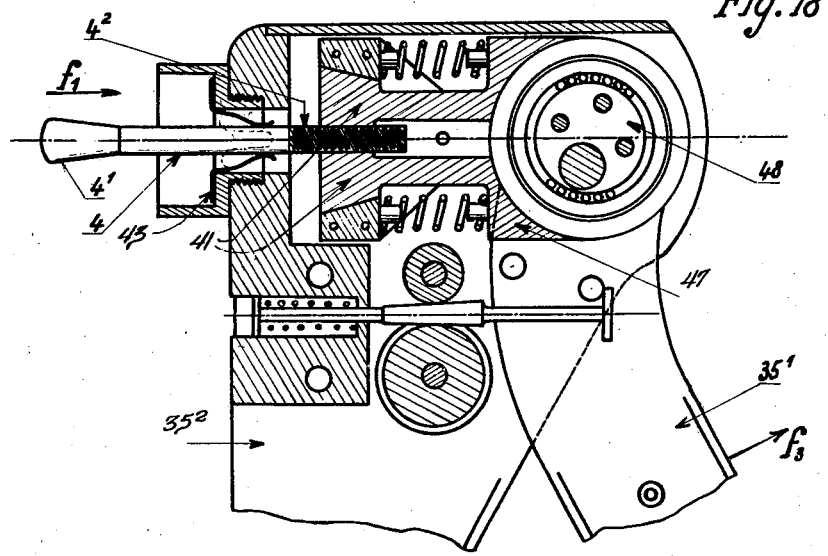
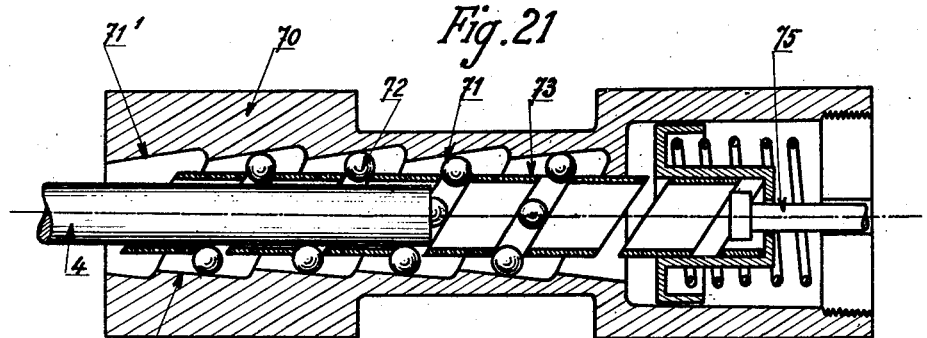
J. F. G. Chobert
INVENTOR.
Attorneys March 14, 1939.  J. F. G. CHOBERT  2,150,361
METHOD OF AND APPARATUS FOR SECURING HOLLOW BODIES IN HOLES IN OTHER BODIES
Filed May 16, 1936  12 Sheets-Sheet 7

J.F.G. Chobert
INVENTOR.

March 14, 1939.  J. F. G. CHOBERT  2,150,361
METHOD OF AND APPARATUS FOR SECURING HOLLOW BODIES IN HOLES IN OTHER BODIES
Filed May 16, 1936  12 Sheets-Sheet 8
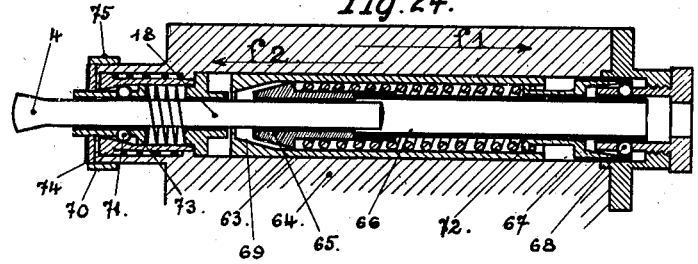
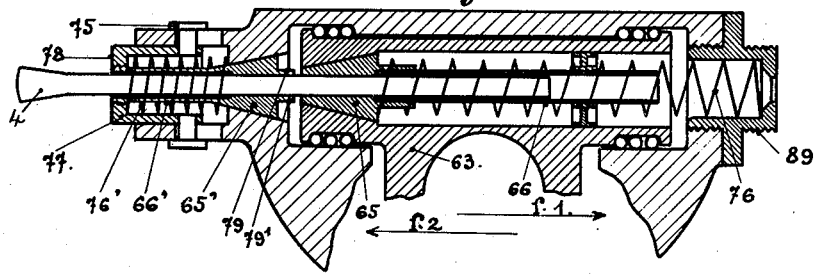
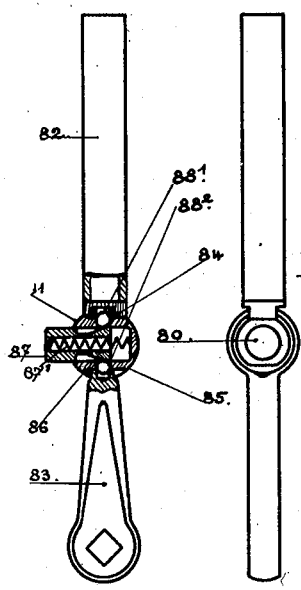
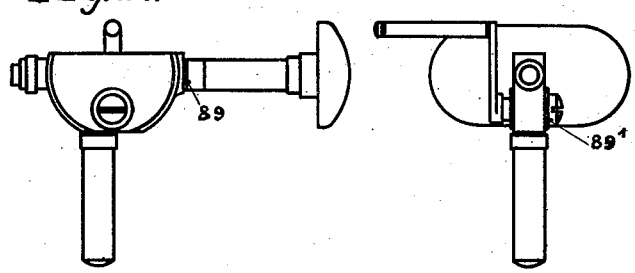
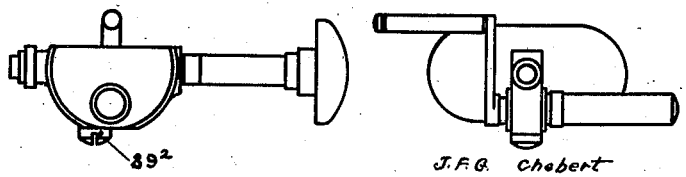
J.F.G. Chobert
INVENTOR.
BY
Attorneys March 14, 1939.  J. F. G. CHOBERT  2,150,361
METHOD OF AND APPARATUS FOR SECURING HOLLOW BODIES IN HOLES IN OTHER BODIES
Filed May 16, 1936   12 Sheets-Sheet 9

J.F.G. Chobert
INVENTOR.
By
Attorneys

March 14, 1939.  J. F. G. CHOBERT  2,150,361
METHOD OF AND APPARATUS FOR SECURING HOLLOW BODIES IN HOLES IN OTHER BODIES
Filed May 16, 1936  12 Sheets-Sheet 10

J. F. G. Chobert,
INVENTOR.
By
Attorneys

March 14, 1939. J. F. G. CHOBERT 2,150,361
METHOD OF AND APPARATUS FOR SECURING HOLLOW BODIES IN HOLES IN OTHER BODIES
Filed May 16, 1936 12 Sheets-Sheet 11
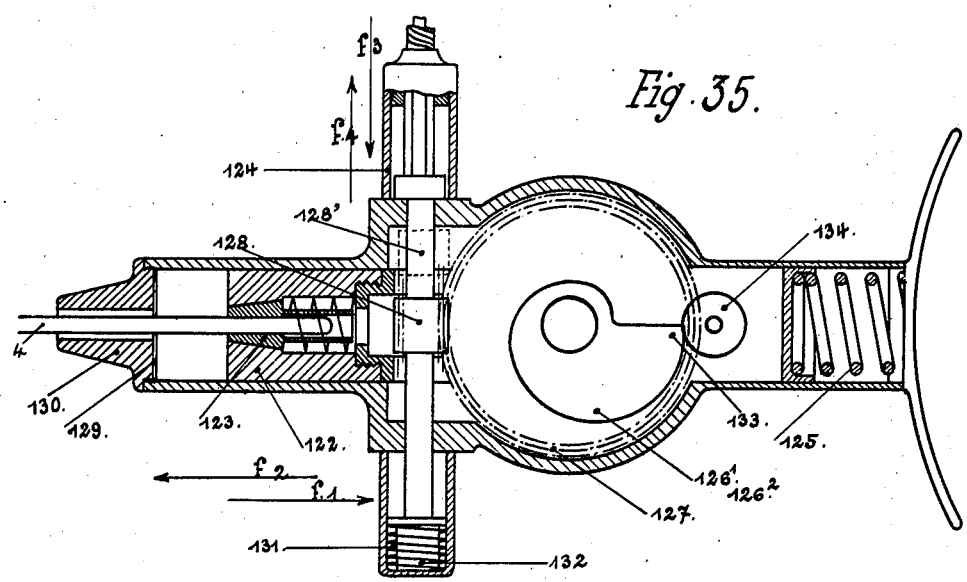

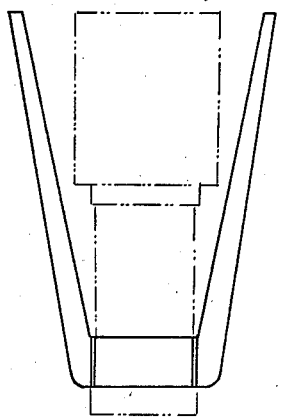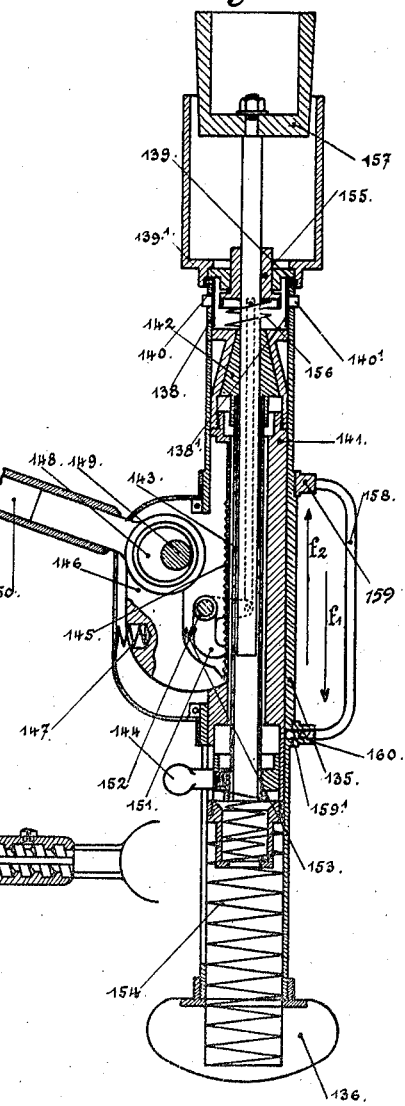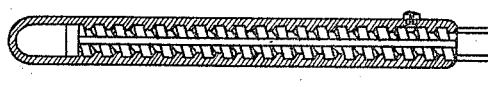

Patented Mar. 14, 1939

2,150,361

UNITED STATES PATENT OFFICE 2,150,361

METHOD OF AND APPARATUS FOR SECURING HOLLOW BODIES IN HOLES IN OTHER BODIES

Jacques Francois Gabriel Chobert, Saint-Etienne, France

Application May 16, 1936, Serial No. 80,210
In France May 20, 1935

16 Claims. (Cl. 153—79)

This invention is for improvements in methods of fixing hollow unions, ferrules and tubular rivets and in apparatus for carrying out said methods and for other applications.

In the specification of French Patent No. 699,044, there is described a method of riveting characterised by a tubular rivet being threaded on the rod of a spindle or drift so as to rest on an enlarged head of the said spindle or drift. The assembly is inserted in an aperture made in the element or elements to be riveted and the spindle is drawn through the rivet whilst keeping the said rivet applied to the element or elements to be riveted. The head of the spindle thereby enlarges the free end of the rivet and secures the same to the element or elements to be riveted.

By means of such a method there is avoided any stress on the elements to be riveted and consequently any deformation of the said elements. Also, the said method permits of assembling, by means of rivets, the sheets forming the sides of a hollow body, such as the fuselage of an aeroplane, which are only accessible from one side.

One object of the present invention is to provide an improved method of fixing a hollow union, ferrule, tubular rivet or other similar hollow element whereby the said fixing is effected in a particularly simple manner and results in a firmly secured assembly.

A second object of the invention is to provide improved means for increasing the resistance of the resultant assembly to torsional forces.

Another object of the invention is to provide improvements in the construction and operation of apparatus for fixing hollow unions, ferrules, tubular rivets or other similar hollow elements by means of a spindle or drift, having an enlarged head, and in general of all apparatus having a working spindle, such as a smooth or a cutting spindle, which is axially displaced during the working operation of the apparatus, whereby the said apparatus may be easily manipulated and operate under the most favourable conditions with regard to the working parts thereof.

A further object of the invention is to provide improvements in the construction of apparatus comprising an axially movable spindle or drift, having a smooth or cutting head, whereby the said apparatus is in the form of an easily manipulated hand-operated tool.

A further object of the invention is to provide improvements in the construction of apparatus comprising a movable spindle or drift, having a smooth or cutting head, which is particularly suitable for operation by remote control.

A further object of the invention is to provide improvements in the construction and operation of apparatus comprising either a smooth spindle or a cutting spindle which is axially displaceable with respect to a member which holds the element to be fixed or cut, whereby the movement of the spindle in the operation of the machine is effected without wear on the shank of the spindle by the means producing the said movement.

A further object of the invention is to provide improvements in the construction and operation of apparatus comprising a movable spindle or drift having a smooth or a cutting head and particularly in the means employed for gripping the said spindle or drift to produce and to arrest the movement thereof, as required.

Yet a further object of the invention is to provide improvements in the construction and operation of apparatus comprising a spindle or drift having a smooth or a cutitng head arranged to be held stationary during the operation of the apparatus and the said operation effected by displacing a movable carriage of the said apparatus.

A still further object of the invention is to provide improvements in the construction of apparatus comprising a movable spindle or drift having a smooth or a cutting head, whereby the said apparatus may be readily manufactured particularly from castings.

In carrying the invention into practice, the method according to the invention as applied to the fixing of a hollow union, ferrule or other similar hollow element engaging in an aperture in a member to which the said hollow element is to be fixed and being supported on one of the faces of the said apertured member, is characterised by the extremity of the hollow element being deformed and enlarged by means of a ring mounted on a spindle or drift inserted within the hollow element, in such a manner that in the first phase of the movement of the spindle from the interior towards the exterior of the hollow element, the said ring expands the edge of the hollow element over the edge of the said aperture in the member, whilst in the second phase the spindle passes through the said ring and thereby ensures in a simple manner the sealed fixing of the hollow element to the apertured member.

In carrying the invention into practice, there is further provided means for increasing the resistance of the resultant union to torsional forces by anchoring means disposed between the united elements.

In carrying the invention into practice, as will be described hereinafter more particularly, the invention also comprises improvements in the construction of apparatus for ensuring in a simple and reliable manner the fixing of hollow unions or tubular rivets, or for cutting an element, such apparatus comprising either a smooth spindle or a cutting spindle which is longitudinally displaceable with respect to a member which holds the elements to be fixed or cut and operating by imparting to the said spindle either a continuous movement or an intermittent movement through the said hollow element. Said apparatus may further involve a control of the movement imparted to the spindle either by eccentric or by cam and a friction or a positive braking of the movement of the spindle.

Still further, in particular embodiments of the invention such apparatus may comprise means for imparting the required movement to the operating spindle either by means of screw threads provided on the said spindle and on a co-operating control element or by friction or positive contact between a movable carriage in the said apparatus, arranged to engage with the said spindle and to displace the same axially by the movement of the said carriage. In yet further constructions, the said operating spindle is held stationary during operation of the apparatus and the said operation effected by displacing a movable carriage of the said apparatus.

The above and other objects, advantages and features of the invention will be more clearly understood from the following description of various embodiments of the invention which is given, by way of example, with reference to the accompanying drawings, in which:

Figure 1 is a section of a stuffing box union fixed to a metal plate by the method according to the invention;

Figures 2 and 3 show the successive phases of fixing the union;

Figure 4 illustrates in section a variation of the method according to Figures 1 to 3;

Figure 5 shows in section another method of fixing a tubular union;

Figure 10:
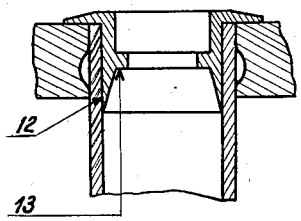
Figure 11:
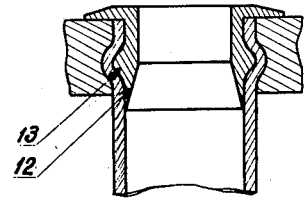
Figure 12:
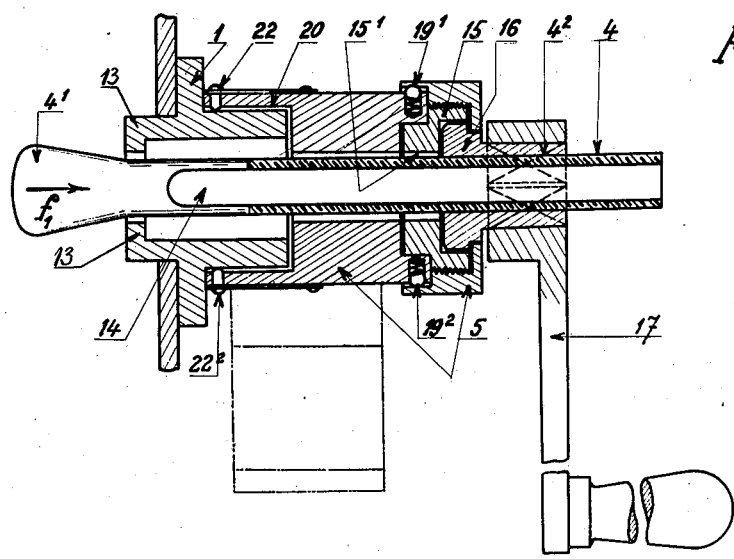
Figure 14:
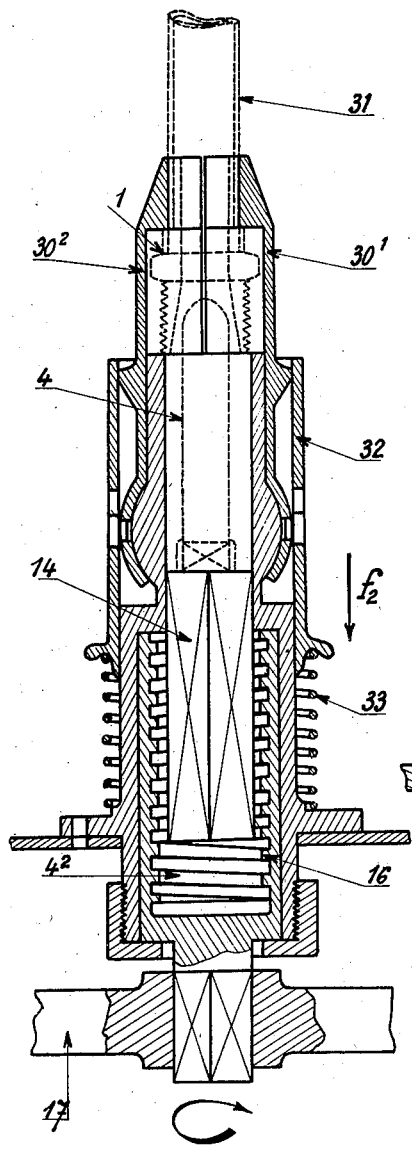
Figure 13:
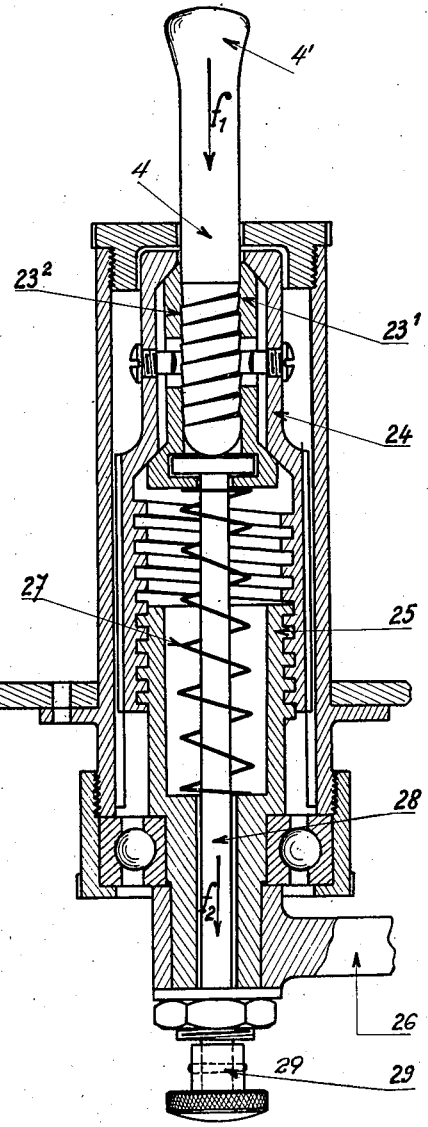
Figure 15:
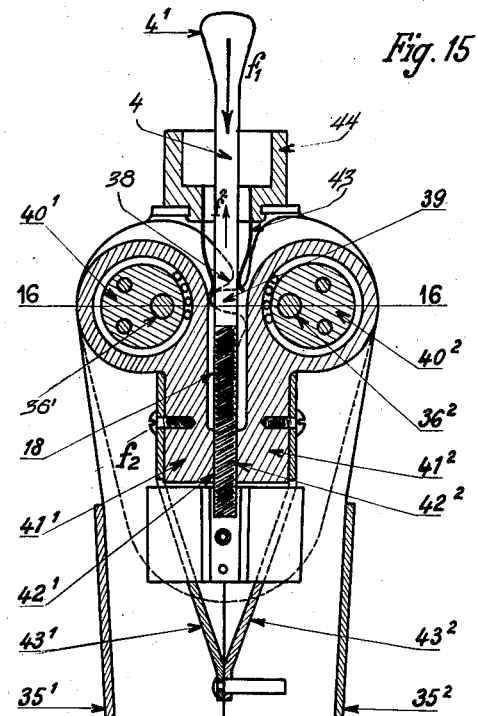
Figure 16:
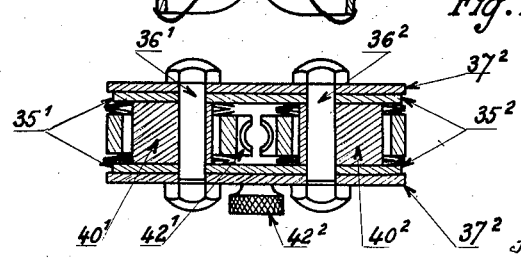

Figures 6 to 8 refer to anchoring means interposed between a union and the extremity of a tube;

Figure 9 is an elevation of a variation of the anchoring means according to Figures 6 to 8;

Figures 10 and 11 are two sectional views of a method of riveting a tube to a plate according to the invention;

Figure 12 is a longitudinal section of one embodiment of an apparatus according to the invention, operating by continuous movement of the spindle, for fixing hollow rivets, unions or other tubular members;

Figure 13 is a longitudinal section of another embodiment of such apparatus;

Figure 14 is a longitudinal section of an apparatus according to the invention, operating by continuous movement of the spindle, for fixing a union at the end of a tube;

Figure 15 is a longitudinal section of an embodiment of apparatus according to the invention, operating by intermittent movement of the spindle;

Figure 16 is a cross-section of said apparatus along the line 16—16 of Figure 15;

Figure 17 shows in elevation a modified form of the apparatus according to Figures 15 and 16;

Figure 18 is a longitudinal section of a further embodiment of apparatus according to the invention, operating by intermittent movement of the spindle.

Figure 19:
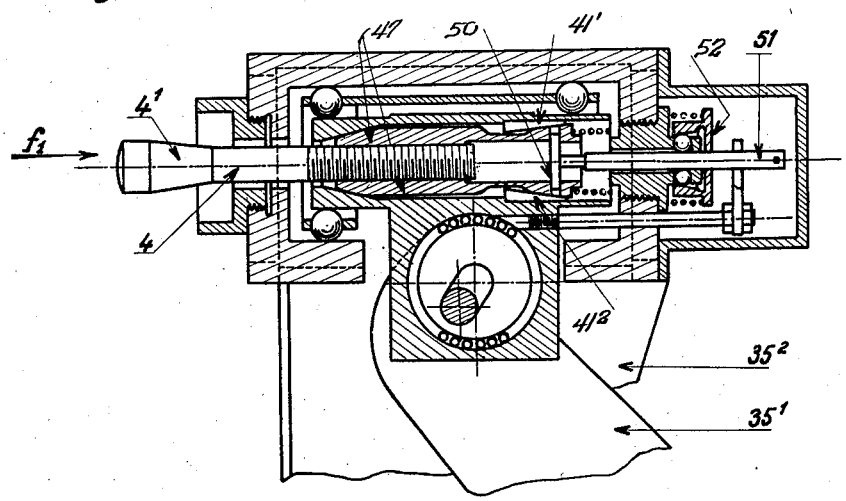
Figure 20:
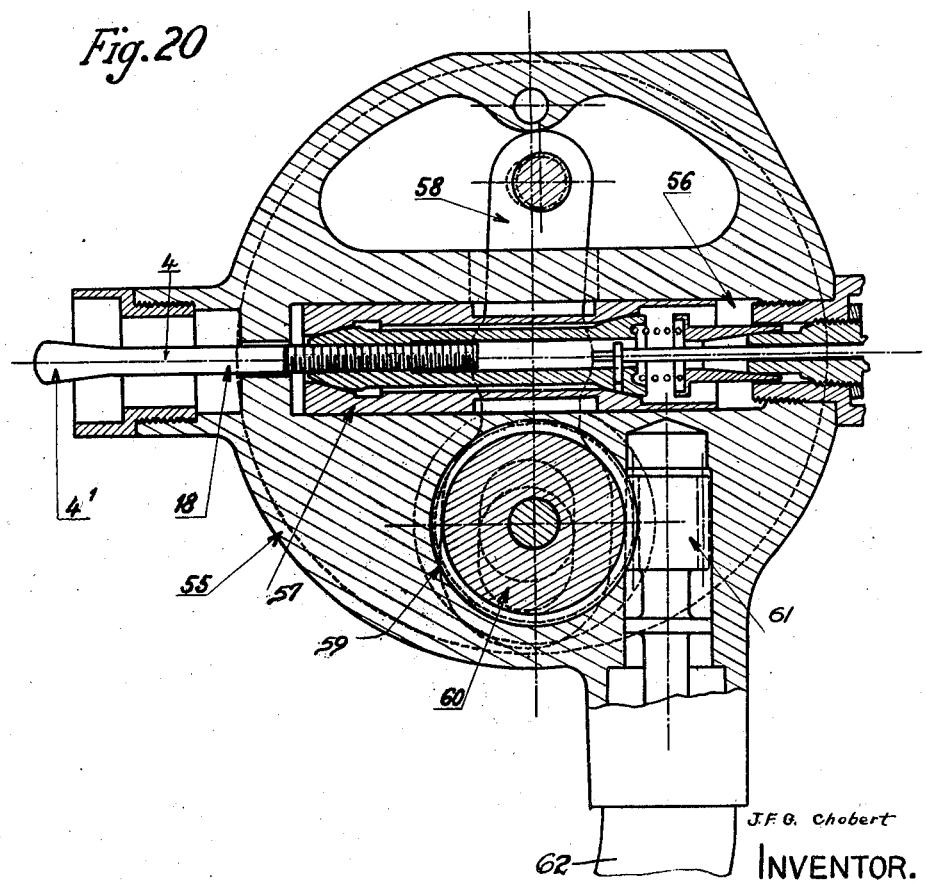

Figure 19 is a longitudinal section of an apparatus according to the invention having a movable carriage for the spindle;

Figure 20 is a sectional view of an apparatus according to the invention, adapted for remote control;

Figure 21 is a view in section of an apparatus according to the invention comprising means for clamping the operating spindle by wedging;

Figure 22 is a view in elevation of a specific form of operating spindle according to the invention;

Figure 23 is a view in elevation of an operating spindle according to the invention provided with a different form of head;

Figure 24 shows in section a construction of apparatus in accordance with the invention in which the operating spindle is gripped by ball pincers or tongs;

Figure 25 shows in section a construction of apparatus in accordance with the invention, in which the operating spindle is gripped by two sets of twin automatically clamping jaws;

Figure 26 shows a crank used in the apparatus according to Figure 25, which can be changed into a lever in order to give two different multiplications;

Figure 26a is a view taken at right angles to Figure 26.

Figure 27 is a reduced side elevation of the apparatus shown in Figure 25.

Figure 27a is a view taken at right angles to Figure 27.

Figure 28 is a view similar to Figure 27 with certain parts in different positions.

Figure 28a is a view taken at right angles to Figure 28.

Figure 29:
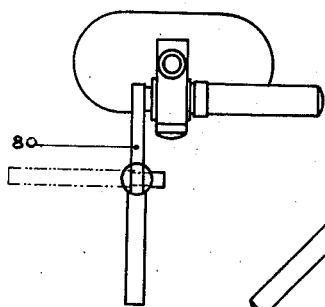

Figure 29 is a view similar to Figure 28a showing different positions of the crank.

Figure 30:
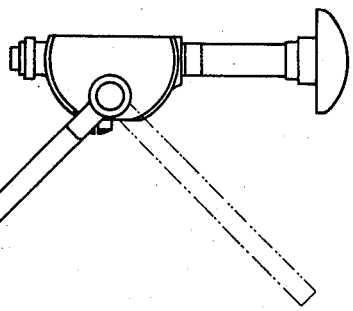

Figure 30 is a view similar to Figure 28 with a different type of actuating lever.

Figure 30A:
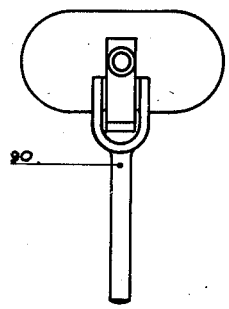

Figure 30a is a view at right angles to Figure 30.

Figure 31:
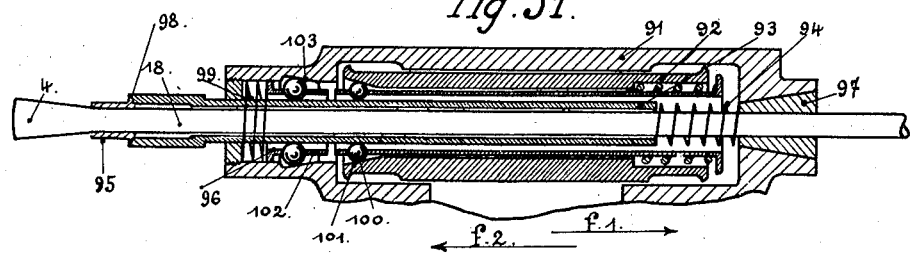
Figure 32:
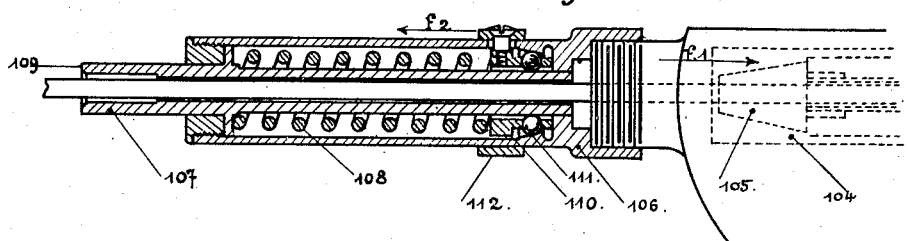
Figure 33:
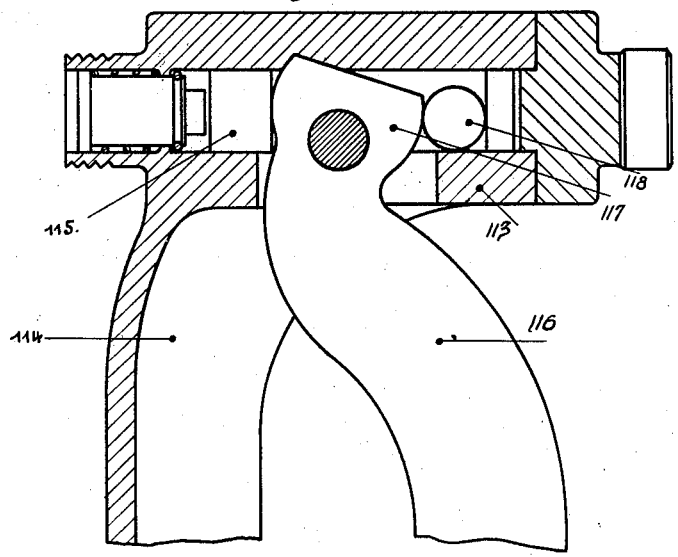
Figure 34:
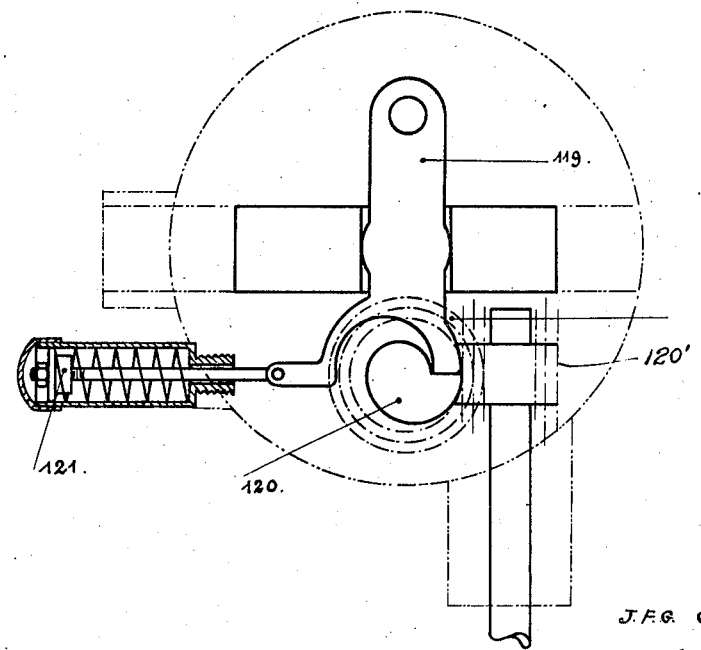

Figures 31 and 32 show modified constructions of apparatus according to the invention in which the operating spindle is held stationary and the operation of the apparatus effected by displacement of a movable carriage of the said apparatus;

Figure 33 shows a machine designed particularly to be made from castings;

Figure 34 shows an embodiment of a control by cam of the reciprocating movement of the apparatus;

Figure 35 shows a motor-operated apparatus;

Figure 36 shows an apparatus operated by direct traction of the spindle;

Figure 37 shows a device for regulating the length of a control lever in the apparatus according to Figure 36; and Figure 38 shows a supporting tripod for the apparatus according to Figure 36 and which ensures a correct positioning of the said apparatus in respect of the work on which the apparatus is to operate.

With reference to Figure 1, there is illustrated therein a method according to the invention of fixing a stuffing box union 1 in an aperture 2 made in a metal plate 3.

To this end, there is threaded on the operating or working spindle 4 of any suitable apparatus 5, of which only the end is shown diagrammatically, an expanding ring 6 which rests on the pear-shaped head 4¹ of the spindle 4. The expanding ring 6 has a conical outer surface on which rests the free edge 8 of the union 1 to be fixed.

The spindle 4 thus provided with the ring 6 and the union 1 is mounted on the apparatus 5 and the union 1 placed in the aperture 2 of the plate 3.

The spindle 4 is then displaced axially in the direction of the arrow $f^1$, whilst the extremity or cap 7 of the apparatus bears against the union 1 and maintains the same in position in the aperture 2. As shown in Figure 2, in the first phase of the movement of the spindle 4, the ring 6 drives out by its conical surface the edge 8 of the union 1 around the whole of the aperture 2. At the end of the said movement, as the resistance of the union 1 increases, the head $4^1$ of the spindle deforms the ring 6. In the second phase of the movement, the spindle 4, as shown in Figure 3, passes freely through the centre of the union 1, the lower edge of which is finally fixed and expanded tightly against the edge of the aperture 2 in the plate 3.

Numerous modifications may be made in carrying out the above method, and in particular the expanding ring 6 may be given any suitable shape. For example, as shown in Figure 4, the expanding ring 6 may comprise a shoulder or collar $6^1$ engaging with the end 8 of the tubular union 1. Such expanding rings 6 with collar $6^1$ are more easily manufactured than rings with conical surfaces such as used in Figures 1 to 3, and they are more easily placed correctly in the tubular element to be fixed.

The method according to the invention thus permits of fixing rapidly, and by a completely tight joint, a smooth tubular union to a plate.

The invention also relates to means which permit of fixing the unions in a more rigid manner than hitherto and enabling the said unions to resist effectively torsional forces.

To this end, as shown in Figure 5, the union 1 is provided with anchoring means, such as a pin 10 or channels 11. After the fixing of the union 1 in the aperture 2 of the plate 3, these anchoring means effectively oppose rotational forces applied to the union 1 and which tend to make the same rotate about the axis thereof.

With the same object in view and in order to oppose the torsional couple which tends to cause a union fixed at the extremity of a tube to rotate, anchoring means may be interposed between the tube and the union.

In the embodiment illustrated in Figures 6 to 8, a tube 80 is provided with a slot 81 at its extremity into which fits a projection 82 carried on the union 83 to be fixed thereto. As shown in Figure 8, after fixing the union 83 in the extremity of the tube 80, the projection 82 engaged in the slot 81 opposes any rotation of the union 83 with respect to the tube 80 (Figure 8).

In the embodiment according to Figure 9, a ring 84 is made integral with the tube 80 on the expansion of this tube, the metal of which engages in internal grooves in the said ring 84. On the other hand, the union and the retaining ring 84 are fixed to one another by interengaging parts 85 which oppose any rotation of the union 83 with respect to the tube on which the said union is fixed.

According to another feature of the invention, as shown in Figures 10 and 11, when fixing the extremity of a metallic tube to a plate, it is advantageous to provide on the edge of the assembling rivet a bevel 12 which extends beyond the actual riveting portion, such as an inner projecting collar 13 (Figure 10), which is forced into the body of the tube (Figure 11). The bevel 12 permits of deadening to a large extent the vibrations of the tube and which therefore increases the solidity of the assembly.

The invention comprises the methods and arrangements above described whatever may be the tools or apparatus used for making the joints. However, the invention also comprises apparatus as described in detail hereafter which permit of effecting the fixing of the hollow members in a particularly rapid and effective manner and the principles of the construction and operation of which are applicable within the scope of the invention to all apparatus operating in an analogous manner.

In the construction of apparatus illustrated in Figure 12, the apparatus comprises a spindle 4 having a smooth pear-shaped head $4^1$, the said spindle being movable longitudinally in the direction of the arrow $f^1$ with respect to the body 5 of the apparatus, with a view to ensuring the fixing of a union 1, for example, by forcing outwards an inner collar provided in the said union 1.

The shank of the spindle 4 has a threaded part $4^2$ and flat parts 14 and is arranged to extend freely through the body 5 of the apparatus. The spindle 4 is given a continuous reciprocating movement by means of a control element, mounted in the body 5 of the apparatus so as to be readily removable therefrom. The said control element comprises a nut 16 engaging with the external screw thread on the shank of the spindle 4 and which is rotatable under the control of a crank 17, and a guide member 15 having flat portions 15' through which the spindle 4 is slidable by means of its corresponding flat parts 14. It will readily be understood that instead of rotating the nut 16 by means of a manual control, as illustrated, such rotation may also be effected by power operated means.

The control element consisting of the rotatable nut 16 and guide 15 is mounted on the body 5 of the apparatus and fixed thereon by clamping projections in the form of spring controlled balls $19^1, 19^2$. Such arrangement permits of mounting in the same body, control elements and operating spindles of varying diameters according to the size of the union to be fixed.

The apparatus of Figure 12 also comprises at its extremity opposite to the aforesaid control element a recess 20 provided with resilient clamping members, such as spring projections 22, $22^2$, which recess is adapted to receive the union 1 to be fixed and to hold the same whilst it is being placed in position. The operation of the apparatus will be readily understood from the above.

In the modified form of apparatus illustrated in Figure 13, the spindle 4 is carried in the body of the apparatus between two shaped jaws $23^1, 23^2$, mounted in a sliding sleeve or carriage 24. The sleeve 24 is slidable in the body of the apparatus but is not rotatable relatively thereto. To this end, the sleeve 24 is mounted externally by means of splines and is provided with an internal screw thread. The said sleeve is displaced in the body of the apparatus by means of an operating screw 25 engaging with the said internal screw thread and which is controlled by a hand-operated crank 26. As in the preceding embodiment, the hand-operated crank 26 may be replaced by any suitable power-operated means.

The jaws $23^1, 23^2$ are forced against the shank of the spindle 4 by the action of a thrust spring 27, whilst a traction rod 28 having an external control knob 29 permits of exerting a pull in the direction of the arrow $f^2$ on the jaws $23^1$, $23^2$, to open the said jaws, and consequently of disengaging the spindle 4 with a view to withdrawing the same from the apparatus. The operation of the apparatus will be readily understood from the above description.

The further construction of apparatus shown in Figure 14 is particularly suitable, for example, for fixing a union on the end of a metal tube.

The said apparatus comprises extending jaws $30^1$, $30^2$ which grip between them the end of the tube 31 on which it is proposed to fix a union 1, the said union 1 being itself held between the jaws $30^1$, $30^2$.

The jaws $30^1$, $30^2$, are confined by means of outwardly directed projections thereon within a sliding sleeve 32 which is under the control of a spring 33 and is operative to keep the said jaws $30^1$, $30^2$ applied against the tube 31. The fixing of the union 1 to the tube 31 is effected by means of an axially movable spindle 4 having a threaded shank $4^2$ and flat parts 14, the movement of which is controlled by a rotatable nut 16 controlled manually from a crank or operating wheel 17.

In order to free the tube 31 after the fixing of the union 1 thereto, the sleeve 32 is caused to slide in the direction of the arrow $f^2$ which disengages the said sleeve from the co-operating projections on the jaws $30^1$, $30^2$ and permits the said jaws to move away from the tube 31.

In the various constructions of apparatus in accordance with the invention above described, it has been assumed that in the operation of the apparatus the spindle 4 is subjected to a displacement by continuous movement. In the further construction in accordance with the invention shown in Figure 15, on the contrary, the spindle 4 is displaced intermittently, that is to say, by successive efforts which ensures the subdivision of the total travel of the spindle in a single working stroke of the apparatus and consequently diminishes the total effort to be produced, this effort being itself divided by the number of successive steps taken to accomplish the total working stroke.

The apparatus shown in Figure 15 is in the form of riveting pliers or tongs. The two lever arms $35^1$ and $35^2$ are respectively hinged to pivots $36^1$, $36^2$ carried by lateral cheeks $37^2$, shown more clearly in Figure 16.

The two lever arms $35^1$, $35^2$ engage with one another by means of a recess 38 on arm $35^1$ and a tooth 39 on arm $35^2$, the arrangement constituting a point of support. Each lever arm $35^1$, $35^2$ controls, through an eccentric $40^1$, $40^2$, a clamping member $41^1$, $41^2$ arranged to engage through threaded parts $42^1$, $42^2$ respectively with the threaded shank 18 of the spindle 4.

These clamping members $41^1$, $41^2$ are normally urged towards one another by leaf springs $43^1$, $43^2$.

In order to produce the displacement of the operating spindle 4 in the direction of the arrow $f^1$, the two lever arms $35^1$, $35^2$ are first separated from one another and then brought together again. This has first for effect to cause the displacement in the direction of the arrow $f^2$ of the clamping members $41^1$, $41^2$ with respect to the shank of the spindle 4. The said clamping members $41^1$, $41^2$ then come into engagement through their threaded parts $42^1$, $42^2$ with the threads 18 on the shank of the spindle 4 which is thus firmly clamped therebetween. During the above-described forward movement of the clamping members $41^1$, $41^2$, the spindle 4 is held stationary by a leaf spring 43 or by any other clamping device, such as balls, expanding collars, etc., carried by a chape 44 integral with the lateral cheeks $37^2$ of the apparatus. When the lever arms $35^1$, $35^2$ are brought together again the eccentrics $40^1$, $40^2$ displace the clamping members $41^1$, $41^2$, and the spindle 4 firmly clamped between them in the direction of the arrow $f^1$.

By repeating the above operation several times, the spindle 4 is displaced by an intermittent movement with respect to the work on which the tool is to operate, such as the fixing of a hollow union, to effect a total working stroke sufficient to ensure the fixing of the said union.

Instead of arranging the spindle 4 and the clamping members $41^1$, $41^2$ along the longitudinal axis of the two lever arms $35^1$, $35^2$, these elements may be disposed according to two perpendicular axes as shown in the modification of the apparatus illustrated in Figure 17. In this modification, like elements have similar reference numerals as in Figure 15, and the lever arm $35^2$ of the apparatus has a curved head, as shown.

In a further construction of apparatus shown in Figure 18, the construction is such that the spindle 4 has imparted to it an intermittent movement by successive traction efforts exerted by extensible clamping members or jaws 41 mounted in a carriage 47 to which a reciprocating movement is imparted.

To this end, the carriage 47 carrying the jaws 41 is actuated by an eccentric 48 operated by one of the lever arms $35^1$ of the apparatus, whilst the other lever arm $35^2$ carries the head of the apparatus in which moves the carriage 47. As in the preceding construction, by imparting to the lever arm $35^1$ oscillating movements in the direction of the arrow $f^3$ and in the reverse direction, there are imparted to the carriage 47 through the eccentric 48, reciprocating movements in the direction of the arrow $f^1$ and in the reverse direction.

In the movement in the reverse direction to the arrow $f^1$, the jaws 41 slide over the threaded shank of the spindle 4, whilst in the movement in the direction of the arrow $f^1$ the said jaws 41 engage with the thread of the spindle 4 and carry the same along in the said movement. The remaining construction and operation of the apparatus are similar to those described above with reference to Figures 15 to 17.

In the further modification according to Figure 19, in which like reference numerals indicate like parts as in Figure 18, the shank of the spindle 4 penetrates progressively, by an intermittent movement, between the jaws or clamping members 41 and abuts at the end of its travel against an automatic release member for the said spindle. To this end, the extensible jaws $41^1$, $41^2$ are carried by a cross piece 50 connected to a rod 51, the said rod 51 extending through a ball bearing 52. At the end of its travel in the direction of the arrow $f^1$, the shank of the spindle 4 strikes against the cross piece 50 and thus displaces the assembly of cross piece and jaws $41^1$, $41^2$. The rod 51 thereby moves in the direction of the arrow $f^1$ and is held fast by the balls 52. The jaws $41^1$, $41^2$ thus remain open which permits of disengaging the spindle 4 therefrom. Such an arrangement obviates the spindle 4, when it has reached the end of its stroke in the direction of the arrow $f^1$, being held fast in the said jaws 41.

The construction of apparatus shown in Figure 7

20 is particularly adapted for operation from a remote control, which permits of reducing the space taken up by the apparatus proper and of making the same lighter in weight whilst increasing its power. This apparatus also permits, for example, the operator to place a large number of rivets without fatigue.

The casing 55 of the apparatus comprises a recess 56 in which is mounted a movable carriage 57 arranged to effect the working stroke of the spindle 4. A reciprocating movement is imparted to the said carriage 57 by a connecting member 58 controlled by an eccentric 59. The eccentric 59 is itself operated by a toothed wheel 60 engaging with an endless worm 61 on to which is applied the remote control through means such as a flexible rotary cable 62. The operation of the apparatus will be readily understood from the above description and the figure of the drawings.

In the constructions of apparatus according to the invention above described, the spindle 4 comprises anchoring means such as screw threads with which engage the clamping or movement-producing members to effect the axial displacement of the said spindle. It is not necessary, however, that the movement should be produced in this manner and in further constructions of apparatus in accordance with the invention, the clamping members producing the said movement constituted by wedge members, the clamping or wedging action of which increases in proportion to the resisting effort.

To this end, in the construction according to Figure 21, a carriage 70 forms the movable part of the apparatus and comprises internally a plurality of recesses having inclined surfaces 71¹, 71², etc., in which are mounted the wedging members in the form of balls 72. The balls 72 are held in their recesses 71 by a retaining cage 73 constituted by a spirally wound metallic ribbon.

The spindle 4 can engage freely in the interior of the cage 73, by coming into engagement with the balls 72 which project into the interior of the cage 73. When the carriage 70 moves in the direction of the arrow f¹, the balls 72 lodge against the inclined surfaces of the recesses 71 and firmly clamp between them the shank of the spindle 4 which the carriage then carries along in its movement in the direction of the arrow f¹. In the return movement of the carriage 70, the balls 72 are displaced in their recesses 71, rolling over the shank of the spindle 4.

To disengage the spindle 4 after the working stroke has been completed by several intermittent movements in the direction of the arrow f¹, a traction member 75 permits of displacing the cage 73 in the direction of the arrow f¹ relatively to the carriage 70, which ensures the return of the balls 72 into the interior of their recesses 71 and the freeing of the spindle 4.

Instead of ensuring the wedging by a large number of balls 72, distributed over the length of the spindle 4, only a small number, such as three balls may be arranged in the carriage 70, these exerting their pressure in the same plane perpendicular to the longitudinal axis of the spindle but such an arrangement has the disadvantage that the said balls may considerably damage the shank of the spindle.

The above improvements in accordance with the invention apply to all apparatus adapted to fix tubular rivets or other hollow elements by means of a shaped spindle or drift and in general to all apparatus involving the axial displacement of a smooth or cutting spindle. The said apparatus may be grouped into two main classes. Apparatus in which the axial movement of the spindle is effected intermittently, thus producing the subdivision of the total length of the working stroke and of the force to be applied to produce the movement of the spindle, such apparatus having the disadvantage, on the other hand, of tending to wear the shank of the spindle by the action of the traction jaws, and apparatus in which the spindle is displaced by a continuous movement.

In the apparatus of the first class, in which are comprised the apparatus of Figures 15, 17, 18, 19, 20, there is the disadvantage that the spindle has a tendency to be forced out of the rivet or other hollow element during the forward travel of the carriage moving the spindle, which travel tends also to wear away the shank of the spindle by the traction jaws. It has further been found, however, that instead of an arrangement for arresting the forward movement of the spindle by friction, as in the apparatus above described, it is advantageous to adopt a positive braking of the spindle with positive control. The embodiments of the invention hereinafter described have therefore for object, various further constructions of apparatus, whether hand or power-operated, involving further improvements in the gripping of the spindle for intermitent movement, and also further constructions of apparatus for continuous traction of the spindle.

Figure 24 illustrates a further construction of apparatus showing an improved method of displacing the spindle by intermittent movement. The movable carriage 63 of the apparatus is slidably mounted in the body 64 of the apparatus. The carriage 63 is given a reciprocating movement either by an eccentric as in the apparatus according to Figure 19, or by means of a cam, a connecting rod, a lever or by any other suitable means.

The carriage 63 is provided in the interior thereof with three jaws 65 secured to a split tube 66, the sides of which tend to cause the said jaws to open, or any other automatic clamping device.

When the carriage 63 is driven in the direction of the arrow f¹, the jaws 65 close under the action of the cone 69 provided in the front end of the carriage 63. They grip the shank 18 of the spindle 4 and draw the head of the spindle backward in the direction of the arrow f¹. In this movement, the shank 18 of the spindle can slide in the ball tongs located in the front of the apparatus and composed of the movable cone 70 and the balls 71. At the end of the travel of the carriage, the jaws 65 and the tube 66 are immobilised with respect to the body 64 of the apparatus by means of the rear ball tongs composed of the cone 67 and the balls 68.

When the movable carriage 63 changes its direction of travel and runs forward in the direction of the arrow f², the tail or shank 18 of the spindle is first brought slightly forward and at this movement the friction of the balls 1 effects the wedging of the shank in the front ball tongs 70—71. The spindle cannot move further forward. On the other hand, the jaws 65 which are now disengaged from the cone 69, open and the jaws 65 which are moving forward with the carriage 63 can slide over the shank 18 of the spindle 4. At the end of the forward travel of the carriage 63, the cone of the rear ball tongs 67 is drawn forward by the holding ring 72, the tube 66 is liberated and the jaws 65 can again clamp the shank 18 of the spindle 4 to displace the same at the moment of the backward travel of the carriage in the direction of the arrow $f^1$.

The construction illustrated in Figure 24 also permits the automatic opening of the jaws 65 when the spindle 4 is at the end of its backward travel. To this end, the arrangement is such that the head 4 of the spindle abuts against the front end of a ring 73 carried by the front cone 70, which in its turn recedes and by means of its extension 74 thrust back the jaws 65 which open. The jaws 65 being opened, the apparatus can no longer operate to displace the spindle 4.

This same arrangement permits of withdrawing the spindle 4 when the work is completed. To this end, it is sufficient, by means of a ring 75 located externally of the apparatus, to thrust back the cone 70 which opens the jaws 65 as above explained.

Such an arrangement may be provided on all apparatus having a carriage or a piston to which a reciprocating movement is imparted.

A further construction of apparatus is illustrated in Figure 25.

The movable carriage 63 of this apparatus is given a reciprocating movement $f^1$—$f^2$ by any suitable means. The said carriage 63 is provided with a set of automatic clamping jaws 65 secured to a resilient split tube 66 or any other suitable device. The said jaws 65 are normally urged in the direction of the arrow $f^2$ by a spring 76.

In the front part of the apparatus, there is provided a second set of jaws 65' secured to a second resilient tube 66', the set of jaws 65' being normally urged towards the rear of the apparatus in the direction of the arrow $f^1$ by a spring 76'.

When the carriage 63 is displaced in the direction of the arrow $f^1$, the jaws 65 tighten in the cone and draw the shank of the spindle 4 in the direction of the arrow $f^1$.

When the carriage 63 changes its direction of travel and moves in the direction of the arrow $f^2$, the shank of the spindle is carried slightly forward in the direction of the arrow $f^2$ but the front jaws 65' are also carried along by friction and immediately tighten on the shank of the spindle and arrest the movement of the latter. The rear jaws 65 partly open as the carriage continues to advance and slide over the shank of the spindle 4.

When the carriage 63 reverses its direction of travel again in the direction of the arrow $f^1$, the rear jaws 65 close, gripping the shank of the spindle 4, while the front jaws 65' open and the spindle is displaced in the direction of the arrow $f^1$.

The above construction offers a safety device at the end of the travel of the spindle through the hollow ferrule 77 to which is connected the tube 66' on which are fixed the front jaws 65'. When the head of the spindle 4 is brought to bear on the face 78 of this ferrule at the end of the total working stroke of the apparatus, after the requisite number of intermittent movements of the spindle 4 in the direction of the arrow $f^1$, the front jaws 65' move back and open, and by means of their extensions 79, 79' they cause the clamping jaws 65 also to move back so that these cannot close again. The carriage 63 can therefore continue its movement but cannot carry the spindle 4 with it.

To remove the spindle 4 from the apparatus when the operation is completed, as in the construction according to Figure 24, it is sufficient to push, in the direction of the arrow $f^1$, the outer ring 75, which, being integral with the jaws 65', causes the jaws 65 to move back and open and the spindle 4 is thus liberated.

The above construction may be provided in all apparatus having a carriage or piston to which a reciprocating movement is imparted.

In the embodiment according to Figure 25, the carriage 63 is controlled by an eccentric actuated by a crank 80 as shown in Figure 26. The crank 80 is articulated at 81 to the junction of the operating handle 82 with an arm 83 and permits of obtaining two different powers.

With the handle folded and locked by the device 81, there is obtained a reduced power on describing one complete revolution.

With the handle unfolded and locked by the device 81, the leverage is doubled and can transmit double the effort. In this case, the lever arm only describes a sector.

To effect the locking of the crank in the two positions, the said crank 83 is provided at its extremity with an eye and the handle 82 is terminated by a fork 84, the two prongs of which pass one on each side of the eye in the crank end. These two parts are similarly bored and are fixed to one another by a hollow axle 85 formed integrally with the fork 84 of the handle 82. In the interior of this hollow axle is a movable cone 86 actuated against the action of a spring $87^1$ by a push-button or the like 87.

The hollow axle is provided with four holes in which are placed four balls and the eye of the lever is provided with two holes $88^1$ and $88^2$ in which the said balls engage when the cone 86 is in the position shown in the drawing. If the push button 87 is pressed, the cone 86 moves in the hollow axle against the action of the spring $87^1$ and thereby allows the balls to come out of the holes $88^1$ and $88^2$ in the eye of crank end so that the position of the handle 82 can be changed.

The apparatus is further provided with a number of threaded tenons 89, $89^1$ and $89^2$, which permit the handle 82 to be placed in the three positions shown by Figures 27, 28 and 29.

In a modification of the apparatus shown in Figure 30, the crank 80 is replaced by a forked lever 90 which grips the axis on each side thereof. This lever is given a backward and forward alternating movement.

The above constructions of apparatus in accordance with the invention relate to apparatus having a carriage or piston to which a reciprocating movement is imparted so that the operating spindle moves relatively to the body of the apparatus which is stationary. It is also possible, however, to modify such constructions so that the spindle is integral with the body of the apparatus, which is maintained stationary during operation, and the means supporting the work on which the tool is to operate is displaceable relatively thereto. Figure 31 shows one construction embodying such principle.

The apparatus comprises a body 91 in which is slidably mounted a carriage 92 having a cone-shaped end 101 and to which is imparted in any suitable manner a reciprocating movement in the direction of the arrows $f^1$ and $f^2$.

The apparatus is provided with a tubular member 93 which serves as a support for rivets or the like to be fitted on the work, the said supporting tube 93 being normally urged in the direction of the arrow $f^2$ by a strong spiral spring 94.

The hollow element 95, such as a rivet, to be fitted, is threaded on the shank of the spindle 18 and the said shank inserted in the apparatus so that the head of the rivet rests on the outer face of the tubular member 93 through which extends the shank of the spindle 18. The said shank also extends through the clamping jaws 96.

By pushing the head 4 of the spindle, the tubular member 93 is caused to recede and the spring 94 is compressed. The shank of the spindle by engaging in the jaws 97 keeps the whole system tensioned.

If the carriage 92 is in the rear limit position corresponding to the arrow $f^1$, upon moving in the direction of the arrow $f^2$, the balls 100 become wedged in the cone 101 of the carriage 92, between the said cone and the tubular member 93. As a result, the tubular member 93 is carried forward in the direction of the arrow $f^2$ and the said tubular member 93 consequently pushes forward the rivet 98 which commences to slide over the head 4 of the spindle.

When the carriage 92 changes its direction of travel and moves in the direction of the arrow $f_1$, the balls 100 are liberated from the cone 101, but the tubular member 93 is still pressed against the head of the rivet 98 by the pressure of the spring 94. The carriage 92 recedes freely in the direction of the arrow $f^1$ and on returning again in the direction of the arrow $f^2$, it again advances the tubular member 93 by the length of its travel. The rivet 98 is consequently forced over the head 4 of the spindle by a similar amount and so on.

If it is feared that the spring 94 may not be sufficient to release the balls 100, there may be added in front a ball tongs 102 having a cone 103 which prevents any movement of the tubular member 93 in the direction of the arrow $f^1$.

To remove the spindle 18 at the end of the operation, it is sufficient to press the jaws 97 which hold the tail of the spindle, in the direction of the arrow $f^1$, and any suitable means may be provided for this purpose.

A modification of the above construction, shown in Figure 32, permits of adapting the same to apparatus not specially arranged for the use thereof, and without changing any existing parts of the apparatus, or of adapting the same to any apparatus having a reciprocating movement and capable of clamping a spindle.

To the front of any existing machine comprising a carriage or piston 104 and means for imparting thereto a reciprocating movement, and which carries a set of automatically clamping jaws 105 or any other similar device, there is fixed a cylindrical member 106 within which is slidably mounted a tubular member 107 which is normally urged in the direction of the arrow $f^2$ by a spring 108.

The cylindrical member 106 is provided in the interior thereof with a ball tongs 110 and cone 111 which prevents the tubular member 107 from moving in the direction of the arrow $f^1$. The position of the said ball tongs 110 may be controlled by means of an outer ring 112.

As employed for riveting, the rivet is placed on the spindle and the shank of the latter introduced into the tubular member 107 so that the rivet head then rests on the outer face 109 of the said tubular member 107.

If at this moment the outer ring 112 is displaced in the direction of the arrow $f^2$ this movement releases the tubular member 107 which can now move against the action of the spring 108, in the direction of the arrow $f^1$, whilst the end of the shank of the spindle slides between the clamping jaws 105.

When the spindle is no longer thrust in the direction of the arrow $f^1$, it is immediately held stationary by means of the clamping jaws 105.

The spindle being in this position, if the carriage 104 is at the end of its forward travel in the direction of the arrow $f^2$, on moving back in the direction of the arrow $f^1$, it draws with it the tail of the spindle and consequently the head of the latter enters into the rivet, since the tubular member 107 cannot recede being held fast by the ball tongs 110—111.

When the carriage returns in the direction of the arrow $f^2$, the spindle is also carried along in the said direction and there should be produced a clearance between the end 109 of the tubular member 107 and the head of the rivet, but at the same time as the spindle moves, the tubular member 107 also advances in the same direction, by the same amount, being urged by the spring 108.

At the end of the travel of the carriage in the direction of the arrow $f^2$, the head of the rivet is still in contact with the tubular member 107. The carriage on changing its direction of travel, again pulls the spindle and the tubular member 107 being held fast by the ball tongs 110—111, the head of the spindle is obliged to pass through the rivet.

The above construction of apparatus described with reference to Figures 31 and 32 may be provided with means for releasing the spindle at the end of the operation to permit of the removal of the latter from an automatic releasing system at the end of the travel of the spindle.

Figure 33 illustrates a construction of apparatus for intermittent movement of the spindle which is so designed as to be manufactured economically by means of parts of malleable cast iron or aluminum bronze.

The apparatus comprises a body 113 cast in one with one of the operating arms 114. The carriage 115 is of steel and is controlled by a lever the long arm 116 of which serves to transmit' the operating force and the short arm 117 of which bears on the carriage 115 and imparts the movement thereto.

To improve the efficiency, rollers 118 are placed at the points where the short arm of the lever bears on the carriage.

The carriage of this machine may be provided with a movement-imparting and safety device described with reference to one of Figures 24, 25 or 31.

The apparatus of Figure 33 is shown, by way of example, with the carriage equipped with the arrangement according to Figure 25.

The invention further comprises constructions of apparatus of the type hereinbefore defined in which the control by eccentric of the reciprocating movement of the carriage is considerably improved.

In the apparatus illustrated in Figure 34, which is similar to the apparatus of Figure 20, the control by eccentric is replaced by a cam control.

The cam has, as compared with the eccentric, the advantage of being able to control the movement of the carriage at various speeds according to whether the work requires to be done with more or less force. It permits also of making the working period last for almost the whole of the 360°, the return stroke being effected if necessary very rapidly and at a high speed.

The apparatus shown in Figure 34 comprises two symmetrical lever arms 119 which bear on two cams 120 fixed one on each side of a large pinion 120'. A spring controlled piston 121 returns vigorously and rapidly the levers 119, so as to obtain a rapid return stroke.

This stroke may be controlled, however, by any other means.

This arrangement may be mounted either on apparatus controlled by a crank or on apparatus controlled by a motor through a flexible connection or a Cardan shaft.

Figure 35 illustrates a construction of apparatus arranged to be driven by motor, and as used for riveting. The movable carriage 122 has a set of automatic clamping jaws 123 and is arranged to be driven in the forward direction of the arrow $f^2$ by a spring 125. It is driven in the reverse direction to the arrow $f^1$ by two cams $126^1$, $126^2$ which are integral with a pinion 127, the teeth of which mesh with the threads of a screw or worm 128.

In the position of rest, the carriage 122 is in the forward limit position corresponding to the arrow $f^2$. The jaws 123 are open, since they abut on the face 129 of a positioning nose piece 130 in the front of the apparatus. The rivet is placed on the spindle 4 and the tail or shank of the spindle inserted in the machine.

When the worm 128 engages with the pinion 127, the carriage 122 is driven in the direction of the arrow $f^1$ by the cams. The spindle 4 is therefore displaced through the rivet to be fitted. The cams, in the embodiment according to Figure 35, impart to the carriage 122, in a single revolution, the displacement necessary for the operation to be completed.

The engagement of the worm 128 with the pinion 127 is effected in the following manner: In the inoperative condition of the apparatus, the spring 131 forces the worm 128 into the position $128^1$ shown in dotted lines. To effect engagement, it is sufficient to slide the handle 124 in the direction of the arrow $f^3$, thereby displacing the worm 128 against the action of the spring 131 and into engagement with the teeth of the pinion 127. When the axis of the worm 128 bears against the stop 132, the pinion 127 is obliged to rotate with the said worm, carrying therewith the cams 126 which displace the carriage 122. When the top 133 of the cams $126^1$—$126^2$ escapes the roller 134 of the carriage 122, the latter, acted upon by the spring 125, drives back the cams and causes the pinion 127 to rotate, which has for effect to return the worm into the position $128^1$.

The carriage 122 is then in the forward position and the spindle 4 can be removed.

This form of control of the movement can also be applied to an apparatus having an intermittent movement of the spindle by employing a carriage provided with suitable means such as described with reference to Figures 24, 25, 31 or 32.

The principle of displacing the operating spindle of the apparatus by means clamping the spindle shank permits of reducing the dimensions of the apparatus, but it has the disadvantage of losing a portion of the useful travel of the tool in consequence of the necessity of taking up the load afresh each time and of the travel necessary for the release.

This loss is felt all the more because the useful travel of the spindle is already short.

On the other hand, the apparatus involving the displacement of the spindle by direct traction take up a little more space but have not the disadvantage of any loss of stroke and permit of simple and robust constructions.

Figure 36 represents a further embodiment of this type of apparatus.

The body 135 of the apparatus is cylindrical and carries at the back a palette 136 and at the front a series of detachable ferrules serving as supporting members and which are secured to the apparatus by some rapid means, such for example as a spring 138 and 138' controlled by a push button or the like 140, 140'. This spring has a projection 139, 139' which engages in a circular groove made on the ferrule.

The body of the apparatus contains a movable carriage 141 provided at the front thereof with a set of automatic clamping jaws 142 secured to a resilient tubular member 143. The jaws 142 may be retracted and opened by pulling on the knob 144 secured to the rear of the tubular member 143.

The lower portion of the carriage forms a rack 145 provided with teeth. The nose piece of a large pawl 146 engages, under the influence of a spring 147, in the teeth of the rack 145. The said pawl 146 is articulated to an eccentric 148, pivoting about an axis 149, whilst the eccentric 148 is controlled by a lever arm 150 of variable length. A much smaller second pawl 151 secured to a spindle 152 engages, under the influence of a spring 153, in the teeth of the rack behind the large pawl 146.

The carriage being in the forward position, on introducing the shank of the operating spindle into the apparatus, the clamping jaws 142 separate and allow the shank of the spindle to slide therethrough.

By operating the arm of the lever 150, the eccentric 148 oscillates and forces the nose piece of the large pawl 146 in the direction of the arrow $f^1$. In its travel, the said pawl 146 carries along the carriage 141 due to the engagement of the pawl in the teeth of the rack 145. The small pawl 151 which is integral with the fixed spindle 152 does not follow the said movement. Its nose piece is raised by the passage of each tooth of the rack 145 and engages in the following tooth thereof. Thus, the carriage 141 can no longer recede in the direction of the arrow $f^2$. Upon operating the lever 150 in the direction of the arrow $f^2$, the eccentric 148 causes the large pawl 146 to recede with respect to the teeth of the rack 145 of the carriage. The nose of the said pawl is raised by each tooth of the rack and engages in the following tooth. The large pawl 146 is thus returned to its original position and is ready to displace again the carriage 141 in the direction of the arrow $f^1$.

On continuing to manipulate the control lever 150 in the above manner, the carriage 141 is displaced, in successive steps, by the whole length of its rack 145 and carries along at each step, the spindle of the apparatus which is thus drawn through the work. To disengage the said spindle after the operation has been completed, it is sufficient to pull the knob 144 to open the jaws 142, thereby releasing the spindle.

If the operation has not been completed, it is nevertheless possible to cause the operating spindle to be moved forward, if desired, in the direction of the arrow $f^2$, by pressing on a small lateral lever keyed on the extremity of the spindle 152 to which is secured the small pawl 151.

This lever causes the small pawl to be lowered so that the nose piece thereof disengages from the teeth of the rack 145. In this movement, the said small pawl 151 also forces the large pawl 146 away from the rack 145 so that the nose piece thereof is also disengaged from the teeth of the said rack.

The carriage 141 is brought forward in the direction of the arrow $f^2$, under the influence of the spring 154, and during this movement the jaws 142 slide over the shank of the operating spindle of the apparatus so that the latter is ready to commence again a fresh complete stroke.

The apparatus is provided with a safety device which comes into operation at the completion of the stroke of the spindle, the said device operating to prevent the carriage 141 from continuing to displace the spindle. The said device comprises a ring 155 controlled by a spring 156. The said ring 155 is connected by a rod or rods to levers keyed to the spindle 152 of the small pawl 151.

At the end of the travel of the operating spindle of the apparatus, when the head 157 rests and presses against the ring 155, the latter through the said connecting rods and levers causes the small pawl 151 to pivot so that the nose piece thereof disengages from the teeth of the rack 145 and also thrusts back the large pawl 146 so that the rack 145 is liberated. The carriage 141 is thereby no longer controlled by the pawls and the large pawl 146 can advance and recede under the control of the operating lever 150 without carrying along the rack 145 and thereby the carriage 141.

In apparatus of the above type, the hand control of the intermittent forward movement of the operating spindle may be placed at different points by varying the disposition of the levers.

If desired, the control of the intermittent movement may be effected automatically. To this end, the arrangement may be such that at the completion of the working stroke, a stop on the carriage operates to throw down the pawls which thus liberate the carriage 141, and the latter is returned quickly by the spring 154 and strikes by means of a second stop a device which operates to replace the said pawls in their operative positions.

The telescopic operating lever of the apparatus may be adjusted to different lengths according to the force to be applied to operate the apparatus. The regulation of the length of this lever may be carried out in various ways. As shown in Figure 37, according to one embodiment, the lever has a solid portion enclosed in a tubular member. The said solid portion of the lever has rectangular threads cut therein and a groove cut along a generatrix. A part of the said groove receives a thin wedge which serves as a stop.

The outer tubular portion has a projection or set screw which engages in the said groove and the threads of the solid portion. On rotating the outer tubular member to the left, the wedge will be struck and the set screw of the tubular member engages in the said groove. The portion constituted by the outer tubular member can now be pulled out to the desired length and by rotating the same to the right the set screw will engage again in the threads of the solid portion to lock the said tubular portion in the position to which it has been set. The said tubular portion may also be under spring control to return the same into its normal position.

The apparatus is also provided with a handle 158 which is freely mounted thereon by means of two rings 159 and 159'. A spring controlled ball 160 enters into recesses made in the body of the apparatus and can fix the said handle in various desired positions.

In order to ensure that the operator places the apparatus in a proper position relatively to the work to be done, the said apparatus may be provided with a supporting tripod as shown in Figure 38.

The length of the legs of this tripod will be calculated according to the height of the ferrule or union or the like to be fixed and adjusting screws provided so as to permit of regulating the length of the said legs.

A signal lamp adapted to light up automatically as soon as one of the legs of the tripod touches the work may also be provided.

The said tripod may also carry an electromagnet of circular or other suitable shape, which causes the said tripod to adhere to the surface of the work in respect of which the apparatus is to be used, and thereby be fixed relatively thereto.

Finally, the invention also comprises operating spindles for apparatus of the type hereinbefore defined, comprising detachable elements as shown in Figures 22 and 23. To this end, a single spindle shank 18 may have mounted thereon, as desired, various heads $4^1$, $4^2$ etc., of different diameters $d^1$, $d^2$, the said heads $4^1$, $4^2$ being fixed thereon, for example, by screwing to the end of the shank 18.

It will be seen from the above that the invention extends not only to improved methods of fixing a hollow union, ferrule, tubular rivet or the like but also to apparatus which permit of fixing such hollow members under the conditions of maximum rapidity and safety, and that the improved constructions of such apparatus according to the invention may be applied to all apparatus of similar type. It will furthermore be understood that where the appended claims cover broadly the constructions of apparatus in accordance with the invention, the said claims are also to be considered as specific claims to the actual embodiments hereinbefore described.

What I claim and desire to secure by Letters Patent of the United States is:

1. In apparatus of the type comprising a working spindle which is longitudinally displaceable to effect a working stroke, the combination of a working spindle and means for effecting longitudinal displacement of said working spindle, said means comprising a longitudinally movable driving element, means for operatively connecting said movable driving element to said spindle to displace said spindle upon movement of said driving element in one direction, and for disconnecting said driving element from said spindle, and means for producing a reciprocating movement of said driving element.

2. In apparatus of the type comprising a working spindle which is longitudinally displaceable to effect a working stroke, the combination of a working spindle and means for effecting longitudinal displacement of said working spindle, said means comprising gripping means arranged alternately to grip and to release said working spindle, means for controlling the gripping of said spindle by said gripping means, and means for imparting a reciprocating movement to said gripping means.

3. In apparatus of the type comprising a working spindle which is longitudinally displaceable to effect a working stroke, the combination of a working spindle, driving means for displacing said working spindle longitudinally in one direction by an intermittent movement to effect a working stroke, and means for releasing said spindle from said driving means at the end of said working stroke so that said spindle may be returned in the opposite direction of movement by a continuous movement.

4. In apparatus of the type comprising a working spindle which is longitudinally displaceable to effect a working stroke, the combination of a working spindle having a working head and a screw-threaded shank and means for displacing said working spindle longitudinally in one direction by an intermittent movement, said means comprising a movable driving element arranged to engage and release alternately said screw-thread on said spindle shank, and means for imparting a reciprocating movement to said driving element.

5. In apparatus of the type comprising a working spindle which is longitudinally displaceable to effect a working stroke, the combination of a working spindle and means for displacing said working spindle longitudinally in one direction by an intermittent movement, said means comprising a driving element arranged to engage with and release alternately said spindle and means comprising an eccentric operable to impart longitudinal movement to said driving element.

6. In apparatus of the type comprising a working spindle which is longitudinally displaceable to effect a working stroke, the combination of a working spindle having a working head and a shank, means for displacing said working spindle longitudinally in one direction by an intermittent movement to effect a working stroke, means for gripping the shank of said spindle to prevent movement thereof in the opposite direction and means for releasing said gripping means when said spindle reaches the end of said working stroke.

7. In apparatus of the type comprising a working spindle which is longitudinally displaceable to effect a working stroke, the combination of a working spindle having a working head and a shank, means for displacing said working spindle longitudinally in one direction by an intermittent movement to effect a working stroke, means for gripping the shank of said spindle to prevent movement thereof in the opposite direction and means operated automatically by said spindle shank for releasing said gripping means when said spindle reaches the end of said working stroke.

8. In apparatus of the type comprising a working spindle which is longitudinally displaceable to effect a working stroke, the combination of a working spindle having a working head and a shank, and means for displacing said working spindle longitudinally in one direction by an intermittent movement, said means comprising a movable driving element, means for imparting to said driving element a reciprocating movement and means disposed between said driving element and said spindle shank whereby said driving element grips said shank by a wedging action in one direction of movement of said driving element and releases said shank in the other direction of movement of said driving element.

9. In apparatus of the type comprising a working spindle which is longitudinally displaceable to effect a working stroke, the combination of a working spindle having a working head and a shank, a movable driving element, means for imparting a reciprocating movement to said driving element, gripping means operated in one direction of movement only of said driving element to grip said spindle shank to displace the same and further gripping means arranged to grip said spindle shank to prevent movement thereof when said shank tends to move in the reverse direction to said first-mentioned movement.

10. In apparatus of the type comprising a working spindle which is longitudinally displaceable to effect a working stroke, the combination of a working spindle having a working head and a shank and means for displacing said spindle longitudinally in one direction by an intermittent movement to effect a working stroke, said means comprising a movable driving element, means for imparting a reciprocating movement to said driving element, means operated in one direction of movement only of said driving element for gripping said spindle shank to displace the same, and means operated by said spindle on the completion of said working stroke for maintaining said gripping means in the non-gripping condition.

11. In apparatus of the type comprising a working spindle which is longitudinally displaceable to effect a working stroke, the combination of a working spindle, means for displacing said spindle longitudinally to effect a working stroke, and control means for effecting said displacement, said control means comprising a manually operable handle and means for varying the setting of said handle to vary the effort required to effect said displacement.

12. In apparatus of the type comprising a working spindle mounted in the body of the apparatus and means for supporting the work in respect of which said spindle operates, said spindle and said work-supporting means being movable relatively to one another to effect a working stroke, the combination of a working spindle, means for supporting the work in respect of which said spindle operates and means for displacing said work-supporting means longitudinally relatively to said spindle to effect a working stroke.

13. In apparatus of the type comprising a working spindle and means for supporting the work in respect of which said spindle operates, said spindle and said work-supporting means being movable relatively to one another to effect a working stroke, the combination of a working spindle, means for supporting the work in respect of which said spindle operates, means for displacing said working spindle longitudinally in one direction by an intermittent movement relatively to said work-supporting means, and means for displacing jointly said working spindle and said work-supporting means in the opposite direction of movement to that of said intermittent movement, in the interval between each successive step of said intermittent movement.

14. In apparatus of the type comprising a working spindle which is longitudinally displaceable to effect a working stroke, the combination of a working spindle and means for displacing said working spindle longitudinally in one direction by an intermittent movement to effect a working stroke, said means comprising a movable driving element, cam control means for displacing said driving element in one direction and means for rapidly returning said cam control means to the operative position after each successive step of said intermittent movement.

15. In apparatus of the type comprising a working spindle which is longitudinally displaceable to effect a working stroke, the combination of a working spindle having a working head and a shank and means for displacing said working spindle longitudinally in one direction by an intermittent movement to effect a working stroke, said means comprising a movable driving element carrying a toothed rack, means for imparting a reciprocating movement to said driving element, gripping means operated in one direction of movement only of said driving element for gripping said spindle shank to displace the same, a pawl engaging in said rack and operable to displace said driving element in one direction of movement, means for imparting a reciprocating movement to said pawl, a second pawl also engaging in said rack and operable to prevent return movement of said spindle shank upon the return movement of said first-mentioned pawl, and means operable to release said second-mentioned pawl.

16. Method of securing a hollow element in an aperture provided in a second element, which consists in deforming and enlarging the extremity of said hollow element by means of a ring mounted on a spindle having an enlarged head inserted within said hollow element, said spindle being forced in to said hollow element in such a manner that in the first phase of said movement, said ring under the action of the enlarged head of said spindle, expands the hollow element into tight engagement with said apertured element, and in the second phase of said movement, the enlarged head of said spindle expands and permanently deforms said ring by passing completely through said ring and said hollow element.

JACQUES FRANCOIS GABRIEL CHOBERT.